US006692406B2

United States Patent
Beaty

(10) Patent No.: US 6,692,406 B2
(45) Date of Patent: Feb. 17, 2004

(54) SHIFT CONTROL STRATEGY FOR USE WITH AN AUTOMATED MANUAL TRANSMISSION COUPLED TO A TURBOCHARGED INTERNAL COMBUSTION ENGINE

(75) Inventor: Kevin D. Beaty, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/226,389

(22) Filed: Aug. 23, 2002

(65) Prior Publication Data

US 2003/0060328 A1 Mar. 27, 2003

Related U.S. Application Data

(60) Provisional application No. 60/315,732, filed on Aug. 29, 2001.

(51) Int. Cl.$^7$ .............................................. F02D 23/02
(52) U.S. Cl. ........................................ 477/32; 477/109
(58) Field of Search ........................... 477/32, 33, 100, 477/107, 109; 60/608

(56) References Cited

U.S. PATENT DOCUMENTS

| 4,779,423 A | * | 10/1988 | Szczupak | .................... | 60/602 |
| 5,050,452 A | * | 9/1991 | Morioka | .................... | 477/33 |
| 5,058,015 A | * | 10/1991 | Leorat | .................... | 477/109 |
| 5,174,259 A | * | 12/1992 | Shinzawa | .................... | 123/357 |
| 5,580,329 A | * | 12/1996 | Hayashi | .................... | 477/33 |
| 5,771,695 A | * | 6/1998 | Halimi | .................... | 60/608 |
| 5,778,329 A | * | 7/1998 | Officer et al. | .................... | 477/33 |
| 5,947,863 A | * | 9/1999 | Grob et al. | .................... | 477/109 |
| 6,233,934 B1 | * | 5/2001 | Church et al. | .................... | 60/602 |
| 6,234,149 B1 | * | 5/2001 | Mills et al. | .................... | 123/486 |

* cited by examiner

Primary Examiner—Rodney H. Bonck
Assistant Examiner—Dennis Abdelnour
(74) Attorney, Agent, or Firm—Kevin M. Hinman

(57) ABSTRACT

The present invention discloses a method for controlling up-shifting of multiple speed change gear transmission used with a turbocharged internal combustion engine. One or more engine operating parameters are selected for control by the control unit. The control unit establishes that an up-shift is about to occur. The engine is placed in a transient operating mode. The transient operating mode includes the steps of reducing a magnitude of at least one of the engine speed and the engine torque to enable shifting from a first gear, and modulating the selected engine operating parameter to maintain the boost pressure by one of increasing the exhaust energy and maintaining the rotational speed of the turbocharger while the magnitude of the at least one of the engine speed and the engine torque is reduced. The control unit establishes that the shift from the first gear has been completed. Upon establishing that the shift from first gear has been completed, the engine is returned to the full-load condition while the selected engine parameter is immediately modulated so as to maintain or increase the torque output of the engine after the shift from the first gear, and the modulation of the selected engine parameter is coordinated with the shifting of the transmission to decrease the turbocharger lag associated with shifting and to thereby increase a power output of the engine substantially immediately upon completion of the up-shift.

14 Claims, 2 Drawing Sheets

SHIFT CONTROL STRATEGY FOR USE WITH AN AUTOMATED MANUAL TRANSMISSION COUPLED TO A TURBOCHARGED INTERNAL COMBUSTION ENGINE

RELATED APPLICATIONS

This application is a Continuation-In-Part of Provisional Patent Application Ser. No. 60/315,732 filed on Aug. 29, 2001.

BACKGROUND OF THE INVENTION

1. Field of the Invention

The present invention relates to automated manual transmissions, particularly automated manual transmissions employing constant mesh gears using sliding jaw clutches to selectively engage a desired gear ratio, used in combination with turbocharged internal combustion engines. In particular, the present invention relates to control of the operating parameters of the engine to which the transmission is coupled and control of the transmission and coordinating control of the two.

2. Description of the Prior Art

Known automated manual transmission shift control strategies are based on commands of a transmission electronic control unit to an engine electronic control unit for particular speeds and loads during gear changes. The automated manual transmissions employ sliding jaw clutches and are typically not suited for power shifting. To achieve a shift, engine power typically must first be reduced. There is typically an associated decrease in the engine's turbocharger boost pressure during the shift event, resulting in less than optimal vehicle performance.

Known automated manual transmission equipped vehicles, typically trucks, rely on a throttle or fuel rack or foot pedal position sensor providing a corresponding signal, an engine speed sensor, and a vehicle speed sensor to determine driver demand and corresponding engine and transmission operating conditions. Under heavy acceleration conditions, the driver pushes the foot pedal to floor. Displacement of the foot pedal to the floor yields approximately 100% of the available foot pedal position sensor travel. The engine responds by increasing the rate at which fuel is metered to the engine (the fuel rate) until maximum power is achieved. At this point, the next transmission gear is selected to enable the continued acceleration of the vehicle. An industry standard controls communication protocol, such as SAE J1939, is employed to communicate commands within the driveline or powertrain system. The transmission overrides the signal from the foot pedal position sensor and commands the engine to go to a reduced speed and load while the transmission shifts out of gear. When the engine speed and load are decreased, the rotational speed of the turbocharger and the associated boost also decrease. Once the transmission has been shifted into the target gear, a command to restore full power is given. However, the engine's response time is delayed at least in part by the time needed to spool up, or increase the rotational speed of the turbocharger. The described delay is commonly referred to as turbo lag. As subsequent up-shifts are made, the cumulative effect on the vehicle speed continues to increase as illustrated in FIG. 3. It is desired to have a method of controlling a powertrain system which minimizes the turbo lag associated with shifting of an automated manual transmission.

SUMMARY OF THE INVENTION

The present invention discloses a method for controlling up-shifting of a vehicular powertrain system used with a turbocharged internal combustion engine operating in a maximum foot pedal position travel or full load condition. The powertrain system includes a multiple speed change gear transmission and a control unit for controlling the engine and the transmission. The method includes the following steps. One or more engine operating parameters are selected for control by the control unit. The engine operating parameters include fuel injection timing, fuel injection rate, fuel injection pressure, turbocharger wastegate control valve setting, intake air throttle setting, variable geometry turbocharger vane position setting, engine valve timing setting and engine valve activation state. The control unit establishes that an up-shift is about to occur from a first gear to a second gear. Upon establishing that an up-shift is about to occur, the engine is placed in a transient operating mode. The transient operating mode includes the steps of: reducing a magnitude of at least one of the engine speed and the engine torque to enable shifting from the first gear, and simultaneously modulating the selected engine operating parameter to maintain a boost pressure (i.e., an elevated intake air or boost pressure produced by the turbocharger). The control unit establishes that the shift from the first gear has been completed. Upon establishing that the shift from first gear has been completed, the engine is returned to the full load condition. The selected engine parameter is immediately modulated so as to increase the torque output of the engine after the shift from the first gear. The modulation of the selected engine parameter is coordinated with the shifting of the transmission to decrease the turbocharger lag associated with shifting and to thereby decrease of a power output response time of the engine. Alternately, this shift control method can be used to reduce exhaust emissions during shift events.

Also disclosed is a control system for controlling up-shifting of a vehicular powertrain system used with a turbocharged internal combustion engine operating in a maximum foot pedal position. The powertrain system includes a multiple speed change gear transmission and a control unit for controlling both the engine and the transmission. The control unit has logic rules effective for implementing the following steps. The logic rules enable establishing that an up-shift is about to occur from a first gear to a second gear. Upon establishing that an up-shift is about to occur, the engine is placed in a transient shift operating mode. The transient shift operating mode includes the steps of: reducing a magnitude of at least one of the engine speed and the engine torque to enable shifting from the first gear, and modulating a selected engine operating parameter to maintain boost pressure (produced by the turbocharger) while the magnitude of the at least one of the engine speed and the engine torque is reduced. The selected engine operating parameter is chosen from a plurality of parameters including: fuel injection timing, fuel injection rate, fuel injection pressure, turbocharger wastegate control valve setting, intake air throttle setting, variable geometry turbocharger vane position setting and engine valve activation state. The logic rules further enable establishing that the shift from the first gear has been completed. The selected engine operating parameter is immediately modulated so as to increase the torque output of the engine after the shift from the first gear. The modulation of the selected engine parameter is coordinated with the shifting of the transmission to decrease the turbocharger lag associated with shifting, to thereby increase a power output of the engine substantially immediately upon completion of the up-shift.

The present invention provides a method of controlling a powertrain system, which minimizes the one of the turbo lag and the exhaust emissions which are associated with shifting of an automated manual transmission.

DETAILED DESCRIPTION

Figure 1:
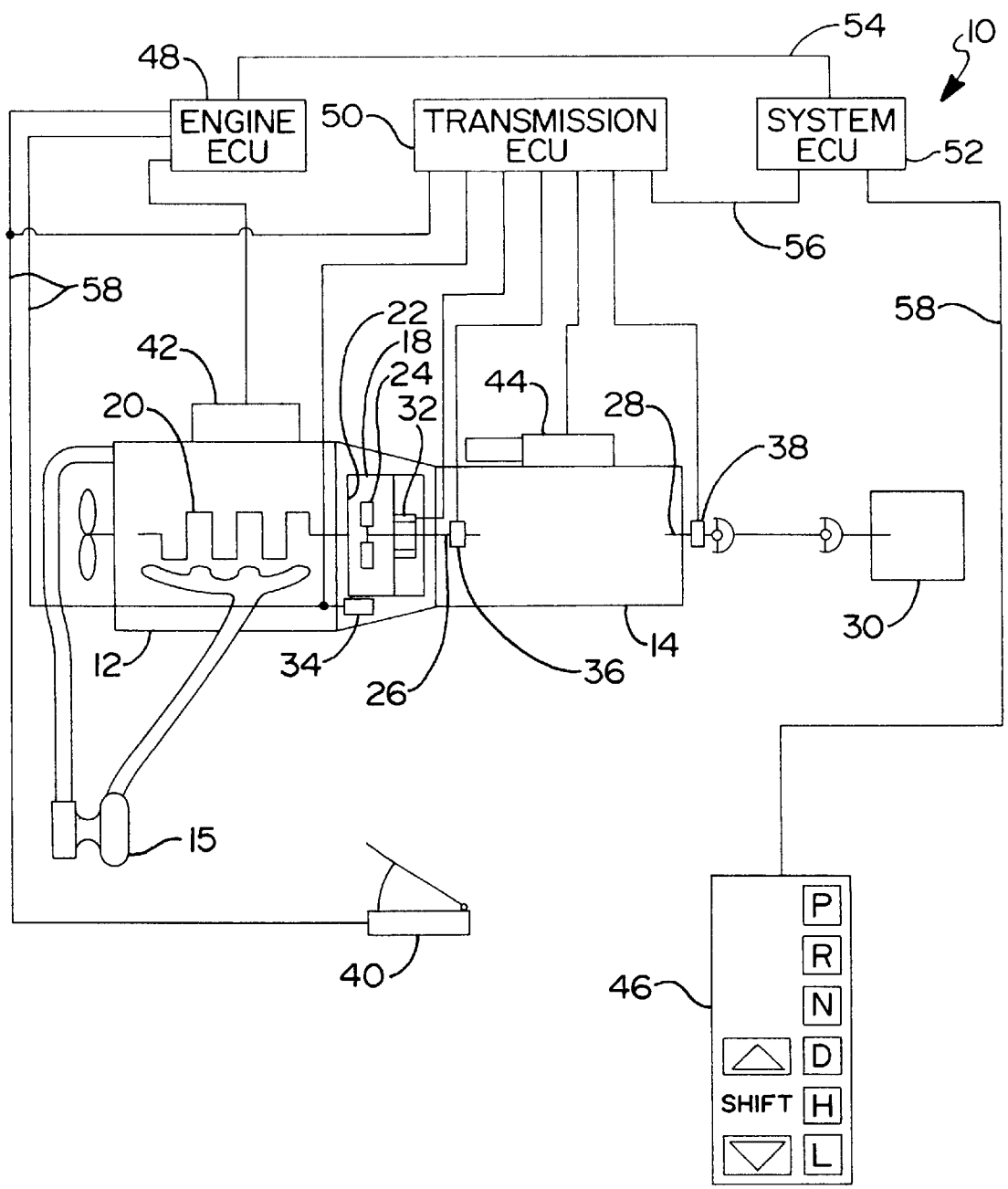
FIG. 1. is a schematic representation of a powertrain control system.

An at least partially automated vehicular driveline or powertrain system 10 using the control system and method of the present invention is schematically illustrated in FIG. 1. System 10 is preferably fully automated. An example of a fully automated system is presented in U.S. Pat. No. 4,361,060.

In system 10, a change-gear transmission 14 employs a well-known countershaft-type construction with multiple constant mesh gears selectively engaged by sliding jaw clutches is drivingly connected to a turbocharged internal combustion engine 12 by a frictional master clutch 18. Transmission 14 may include a splitter/range auxiliary unit providing additional transmission ratios. Transmission 14 by way of example may be of the type well known in the prior art and sold by the assignee of this application, Eaton Corporation, under the trademarks "Super-10" and "Lightning", and may be seen in greater detail by reference to U.S. Pat. Nos. 4,754,665 and 5,974,354.

Engine 12 is turbocharged. That means that engine 12 includes a turbocharger 15. Turbochargers are well known in the fields of internal combustion engines and engine controls. A turbocharger increases the power output of an engine by using an exhaust driven turbine or impeller to force additional air into the engine cylinders. Turbochargers 15 have a compressor section driven by a turbine section. The turbine section has a turbine wheel with a plurality of turbine blades fixed to it. Exhaust gas is routed from the engine cylinders to the turbine section. The exhaust gas acts against the turbine blades to rotate the turbine wheel. Rotation of the turbine wheel, in turn, rotates a centrifugal compressor that comprises the compressor section. The centrifugal compressor draws in fresh air and forces it into the engine cylinders during the intake engine cycle. A wastegate is commonly used on the turbine side to control the amount of exhaust gas reaching the turbine. This is done to prevent the turbocharger from providing an excessive magnitude of boost or compressed air pressure to the engine. Variable geometry turbochargers provide an alternative means of controlling boost pressure. By changing the angle of the blades relative to the direction of exhaust gas flow, the amount of boost and compression can be controlled.

Engine 12 includes a crankshaft 20 that is attached to a driving member 22 of master clutch 18. Driving member 22 frictionally engages with, and disengages from a driven member 24 of master clutch 18. Driven member 24 is attached to an input shaft 26 of transmission 14. A transmission output shaft 28 extends from transmission 14. The transmission output shaft 28 is drivingly connected to the vehicular drive wheels through a drive axle 30 or a transfer case.

The terms "engaged" and "disengaged" as used in connection with the master friction clutch 18 refer to the capacity, or lack of capacity, respectfully of the clutch to transfer a significant amount of torque. Mere random contact of the friction surfaces, in the absence of at least a minimal clamping force is not considered engagement.

The master friction clutch 18 is selectively engaged and disengaged by operation of a clutch actuating mechanism 32. Acceptable clutch actuating mechanisms include pneumatic or hydraulic pistons pivoting a conventional shift lever that displaces a release bearing acting in a manner well known in the prior art. Alternative actuating means and clutch types, such as piston actuated multi-plate wet clutches may also be employed within the scope of the present invention. Clutch actuating mechanism 32 must be responsive, directly or indirectly, to a remotely initiated electronic control signal.

Powertrain system 10 further includes rotational speed sensors 34 for sensing engine rotational speed, 36 for sensing transmission input shaft rotational speed, and 38 for sensing transmission output shaft rotational speed, and providing signals indicative thereof. The units employed in association with the speed of the rotating elements are typically revolutions per minute or RPMs. A foot pedal position sensor 40 provides a signal indicative of foot pedal position. The signal for foot pedal position is commonly expressed as a percentage (0% to 100%) of available foot pedal travel. The 100% condition is also characterized as a full rack condition for diesel engines. Engine 12 is electronically controlled. In the exemplary embodiment, engine 12 includes an electronically responsive engine controller 42. Sensor 40, in combination with controller 42, could be used to control engine fueling. It should be appreciated that controller 42 may actually be comprised of a plurality of electronically responsive components such as fuel injectors, fuel pressure regulation means, turbocharger wastegate control valves, intake air control means, engine valve timing control means, turbocharger vane position setting means, engine valve timing setting means and engine valve activation state control means.

An X-Y shift actuator 44 may be of the types illustrated in U.S. Pat. Nos. 5,281,902 and 4,821,590. Actuator 44 is provided for automated or shift-by-wire shifting of transmission 14. One exemplary actuator has a pair of electrically operated motors or servos that shift transmission 14 through a mechanical interface. A shift selector 46 allows the vehicle driver to select a mode of operation and provides a signal indicative of the gear ratio of the desired gear, or a target gear ratio. The shift selector 46 shown in FIG. 1 has a plurality of gear range buttons which can be selected by the vehicle operator. Shift selector 42 could alternatively take other forms not illustrated such a shift lever having a shift knob. The lever could be toggled between position corresponding to gear ranges.

Engine controller 42 and X-Y shift actuator 44 communicate through the system 10 via an engine electronic control unit (ECU) 48 and a transmission ECU 50 and a system ECU 52. Engine ECU 48 and system ECU 52 communicate with each other over a first multiplexed data bus 54 employing an appropriate communications protocol such as SAE J1922, SAE J1939, ISO 11898 or the like. Transmission ECU 50 and system ECU 52 similarly communicate with each other over a second multiplexed data bus 56. It should be appreciated that the invention would operate equally well if one or more of the ECU's 48, 50 and 52 were combined.

ECU's 48, 50 and 52 are preferably microprocessor-based control units of the type well known in the prior art. ECU's 48, 50 and 52 receive input signals from foot pedal position sensor 40, and speed sensors 34, 36 and 38 over conventional electrical signal and power conducting elements 58 such as wires. ECU's 48, 50 and 52 process such signals according to predetermined logic rules to issue command output signals to system actuators, such as engine controller 42, shift actuator 44 and the like over conducting elements 58. ECU's 48, 50 and 52 may also direct each other to issue command signals. The communications protocol may establish a priority of such commands. The ECUs store control algorithms or programs for controlling the engine 12, the transmission 14 and the clutch 18.

As is known, to disengage a jaw clutch in a vehicular mechanical transmission, especially in a heavy-duty vehicle, it is necessary to relieve torque lock at the engaged jaw clutch. If opening the master friction clutch 18 is not desirable, torque lock can be relieved by fueling the engine to cause driveline torque to approach zero and/or by forcing torque reversals, which will positively cause crossings of zero driveline torque.

Full or partially automated mechanical transmission systems that, upon determining that a shift from a currently engaged ratio into neutral and then into a target ratio is desirable, will, while maintaining the vehicle master friction clutch engaged, initiate automatic fuel control to cause reduced torque across the jaw clutches to be disengaged, are also known in the prior art. Shifting with the master clutch 18 remaining engaged is preferred in many situations, as such shifts tend to be of a higher shift quality and/or cause less wear on the driveline. These systems include systems that attempt to fuel the engine to achieve and maintain a zero driveline torque, as shown in U.S. Pat. No. 4,593,580, and systems that fuel the engine to induce one or more torque reversals, as shown in U.S. Pat. No. 4,850,236. Upon sensing a transmission neutral condition, clutch 18 is maintained engaged and the engine speed commanded to a substantially synchronous speed for engaging a desired or target gear ratio.

Control of engine torque to achieve a desired output or flywheel torque is known as and may be seen by reference to U.S. Pat. No. 5,620,392. Engine torque as used herein refers to a value indicative of an engine torque, usually gross engine torque, from which an output or flywheel torque may be calculated or estimated. The relationship of gross engine to flywheel torque is discussed in U.S. Pat. Nos. 5,509,867 and 5,490,063. An engine torque value may be estimated using a plurality of operating parameters including fuel flow rate, air flow rate and air temperature. By way of example, datalinks complying with SAE J1939 or similar protocols, allow ECU 52 to issue commands over the datalink for the engine to be fueled in any one of several modes, such as:

(i) in accordance with the operator's setting of the foot pedal,
(ii) to achieve a commanded or target engine speed,
(iii) to achieve a commanded or target engine torque, and
(iv) to maintain engine speed or engine torque below certain preset limits.

Many input/informational signals, such as engine speed, engine torque and the like may also be carried by buses 54 and 56 and conducting elements 58.

As noted above, the present invention employs communication from the transmission ECU 50 to the engine ECU 48. The communication is used to signal engine ECU 48 that the engine speed/torque correlating to the pedal position is to be considered by engine ECU 48 in the operation of engine controller 42.

A break in the engine torque applied to the transmission 14 facilitates shifting by eliminating the torque lock on the engaged jaw clutch. A break in torque is especially needed when the system is in a 100% foot pedal position condition. The torque break is typically achieved in one of the two ways described above: the frictional master clutch is disengaged by the clutch actuating mechanism 32, or the engine load is reduced to zero by manipulation of engine controller 42.

Shifting is controlled by ECU 50. ECU 50 commands a break in torque to enable shifting. When transmission torque has been effectively reduced to zero by either use of the master clutch 18 or by manipulation of the engine controller, 42, X-Y shift actuator 44, responsive to transmission ECU 50, shifts the transmission from the current or first gear to an intermediate to a neutral range or position on the way to a target or second gear.

The references herein to first and second gear are not intended to limit the description to specific gears or gear ranges. First gear and second gear may correspond to not only a first gear and a second gear, but also to a second gear and a third gear and a third gear and a fourth gear and so on.

The engine ECU 48 is programmed to recognize, upon notification by the transmission ECU 50, that the speed/torque reduction associated with the shift-necessitated torque break is only temporary, and that maximum power will be required immediately upon selection and engagement of the target gear. Engine ECU 48 is further programmed to accordingly adopt control strategies preparing the engine 12 for a rapid restoration of full power. The strategies include directing the engine controller 42 to modulate a selected engine parameter so as to facilitate the virtually instantaneous restoration of power. Such steps include, but are not limited to, any combination of the following:

Controlling of engine fuel injection timing, rate, and/or pressure settings to maintain and/or increase exhaust energy (Q) rate for purposes of keeping turbocharger operation and boost pressure elevated;

Controlling of turbocharger wastegate control valve in order to maintain and/or increase the turbocharger rotational speed for purposes of keeping turbocharger operation and boost pressure elevated;

Use of the intake air throttle for restricting manifold absolute pressure (MAP) during rapid engine deceleration while maintaining high intake manifold boost pressure on the upstream side of the air throttle;

Controlling variable geometry turbocharger (VGT) vanes so as to maintain and/or increase the turbocharger rotational speed for purposes of keeping turbocharger operation and boost pressure elevated; and Using variable valve timing (VVT) or the use of valve deactivation for purposes of keeping turbocharger operation and boost pressure elevated.

Any of the above alternative methods selected for use are preferably employed during the shift event, particularly leading up to full restoration of boost pressure immediately before shifting out of gear. As an example, when shifting out of the first gear is initiated, the compressor blades of the turbocharger are commanded to pivot to an angle providing very little displacement of air by the turbocharger so as to be compatible with engine operation during the torque break. At the same time, fuel injection timing is delayed to increase the exhaust temperature and available exhaust energy so that the turbocharger is maintained at an elevated rotative speed. Full power is rapidly restored by pivoting the compressor blades back to a maximum displacement orientation at the same time as full fuel rate is restored to the engine. It should be appreciated that other methods of maintaining turbocharger rotational speed may be employed. Further, other parameters mentioned above may be employed to achieve the desired rapid restoration of torque.

Figure 2:
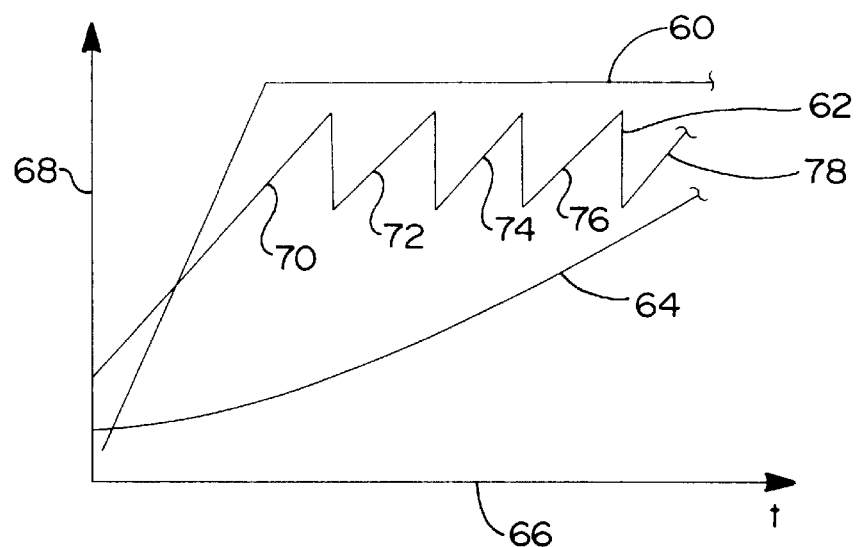
FIG. 2. is a plot of acceleration parameters.

FIG. 2 is a plot showing ideal system performance under maximum foot pedal position operating conditions. A foot pedal position plot 60 shows the rapid increase to the 100% foot pedal position plateau. A saw-tooth plot of engine speed 62 overlays plot 60. Engine speed plot 62 reflects transmission shifts from first to second to third to fourth and to fifth gears. Vehicle speed plot 64 shows a steady increase in vehicle speed. Vehicle speed 64 correlates to the signal provided by sensor 38. Engine speed 62 corresponds to the signal from sensor 34. Horizontal axis 66 is scaled in units of time. Vertical axis 68 is not labeled in FIG. 2 but would have a plurality of scales corresponding to foot pedal position (percent) engine rotational speed (RPM) and vehicle speed (MPH/KPH). Engine speed plot 62 is characterized by the saw-tooth pattern having a first gear ramp portion 70, a second gear ramp portion 72, a third gear ramp portion 74, a fourth gear ramp portion 76 and a fifth gear ramp portion 78.

Figure 3:
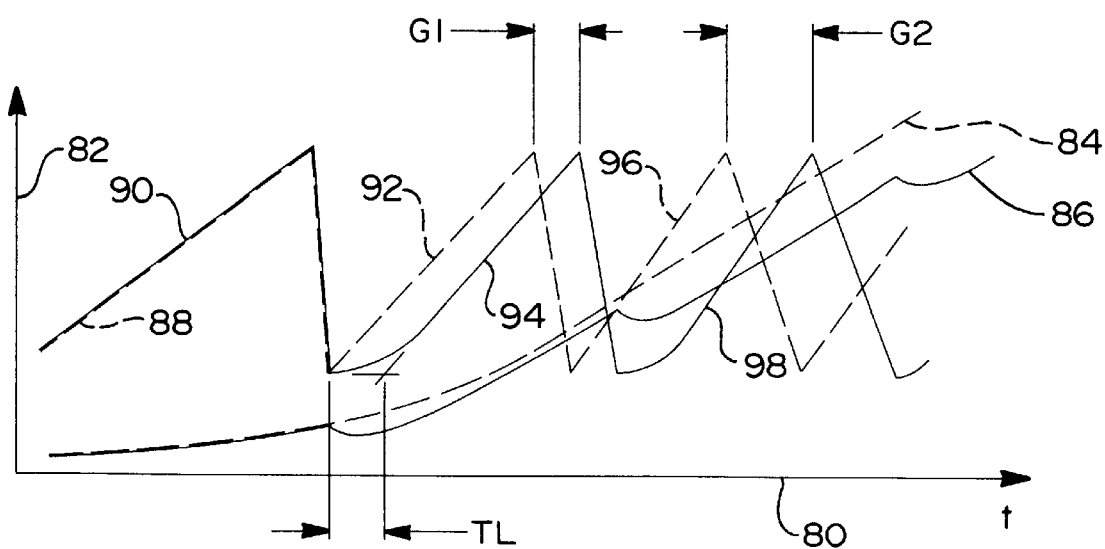
FIG. 3. is a plot showing the effect of turbocharger lag on vehicle performance.

FIG. 3 compares an ideal system, as shown in FIG. 2, with an approximation of a system suffering from turbocharger lag. The lag time is created by the need to spin up the turbine and compressor to a speed where effective boost is provided. Horizontal axis 80 is in units of time (t). Vertical axis 82 is in units of RPM for engine speed and miles per hour (MPH) or kilometers per hour (KPH) for vehicle speed. An ideal vehicle speed curve 84 is presented in phantom. A lag affected curve 86 is shown as a solid line.

An ideal first gear ramp of a curve 84 is coincident with an actual or operating first gear ramp plot 90 shown as a solid line. Similarly, the engine speed reduction associated with shifting out of first gear is coincident between the ideal system, and an actual system. The presence of turbo lag is first seen in both the engine speed and vehicle speed upon the reapplication of engine loading in second gear. The second gear portion 92 of the ideal engine speed trace 84 leads that of the actual trace 94 by a quantity of time shown in FIG. 3 as TL. Time period TL may be characterized as "turbo lag". This difference, TL, is approximately the same at the point where the transmission is shifted from second gear into third gear. The subsequent third gear turbo lag shows the cumulative effect of the shifts from first to second and second to third. The resultant gap G2 is approximately twice as large as gap G1. It should be appreciated that turbo lag also affects the vehicle speed as reflected by the dips in curve 86, causing it to vary from ideal curve 84.

The present invention allows the engine control strategy to employ any number of possible strategies to increase the transient response of the engine immediately upon completion of the change of gear, and subsequent full power application. These strategies may include, but are not limited to, control of full injection timing, rate and/or pressure settings. They will beneficially reduce the turbo lag time by a significant amount.

Although the present invention has been described with a certain degree of particularity it is understood that the description of the exemplary embodiment is by way of example only and that numerous changes to form and detail are possible without departing from the spirit and scope of the invention as hereinafter claimed.

What is claimed is:

1. A method for controlling up-shifting of a vehicular powertrain system (10) used with a turbocharged internal combustion engine (12) operating in a maximum foot pedal position and in an associated full-load condition, the powertrain system including a multiple speed change-gear transmission and a control unit for controlling the engine and the transmission, the method comprising:
    selecting one or more engine operating parameters to be controlled by the control unit, the engine operating parameters including fuel injection timing, fuel injection rate, fuel injection pressure, turbocharger wastegate controller valve setting, intake air throttle setting, variable geometry turbocharger vane position setting, engine valve timing setting, engine valve activation state;
    establishing that an up-shift is about to occur from a first gear to a second gear;
    upon establishing that an up-shift is about to occur, placing the engine in a transient shift operating mode which includes the steps of:
        reducing a magnitude of at least one of the engine speed and the engine torque to enable shifting from the first gear, and simultaneously modulating the selected engine operating parameter to maintain the boost pressure by at least one of increasing the exhaust energy and maintaining the rotational speed of the turbocharger;
    establishing that the shift from the first gear has been completed;
    upon establishing that the shift from the first gear has been completed:
        returning engine to the full-load condition, while also immediately modulating the selected engine parameter so as to increase the torque output of the engine, and
        coordinating the modulation of the selected engine parameter with the shifting of the transmission to resultantly at least one of:
            decrease the turbocharger lag associated with shifting and to thereby decrease a power output response time of the engine, and
            reduce exhaust emissions during shifting events.

2. A method as claimed in claim 1, further comprising the step of executing the shift from the first gear to the second gear using a shift actuator responsive to a control signal from the controller.

3. A method as claimed in claim 1, wherein the selected engine operating parameter is the turbocharger vane position setting.

4. A method as claimed in claim 1, wherein the selected engine operating parameter is the turbocharger wastegate controller valve setting.

5. A method as claimed in claim 1, wherein the selected engine operating parameter is the fuel injection timing setting.

6. A method as claimed in claim 1, wherein the selected engine operating parameter is the fuel injection rate setting.

7. A method as claimed in claim 1, wherein the selected engine operating parameter is the fuel injection pressure setting.

8. A control system for controlling up-shifting of a vehicular powertrain system using a turbocharged internal combustion engine operating in a maximum foot pedal position and in an associate full-load condition, the powertrain system including a multiple speed change-gear transmission and a control unit for controlling both the engine and the transmission, the control unit having logic rules effective for:
    establishing that an up-shift is about to occur from a first gear to a second gear;
    upon establishing that an up-shift is about to occur, placing the engine in a transient shift operating mode which includes the steps of:

reducing a magnitude of at least one of the engine speed and the engine torque to enable shifting from the first gear, and modulating a selected engine operating parameter to maintain the boost pressure by at least one of increasing the exhaust energy and maintaining the rotational speed of the turbocharger while the magnitude of the at least one of the engine speed and the engine torque is reduced, the selected engine operating parameter being chosen from a plurality of parameters including: fuel injection timing, fuel injection rate, fuel injection pressure, turbocharger wastegate controller valve setting, intake air throttle setting, variable geometry turbocharger vane position setting, engine valve timing setting, engine valve activation state;

establishing that the shift from the first gear has been completed;

upon establishing that the shift from the first gear has been completed:

returning the engine to full load-condition, while also immediately modulating the selected engine operating parameter so as to increase the torque output of the engine, and coordinating the modulation of the selected engine parameter with the shifting of the transmission to at least one of:

decrease the turbocharger lag associated with shifting and to thereby decrease a power output response time of the engine, and reduce exhaust emissions during shifting events.

9. A system is claimed in claim 8, further comprising the step of executing the shift from the first gear to the second gear using a shift actuator responsive to a control signal from the controller.

10. A system as claimed in claim 8, wherein the selected engine operating parameter is the vane position setting.

11. A system as claimed in claim 8, wherein the selected engine operating parameter is the turbocharger wastegate controller valve setting.

12. A system as claimed in claim 8, wherein the selected engine operating parameter is the fuel injection timing setting.

13. A system as claimed in claim 8, wherein the selected engine operating parameter is the fuel injection rate setting.

14. A system as claimed in claim 8, wherein the selected engine operating parameter is the fuel injection pressure setting.

* * * * *